(12) United States Patent
Wood

(10) Patent No.: US 7,665,436 B2
(45) Date of Patent: Feb. 23, 2010

(54) AIR COOLED TWIN CAM V-TWIN MOTORCYCLE ENGINE TIMING BELT SYSTEM

(75) Inventor: Bob Wood, 3440 Martin St. South, Cropwell, AL (US) 35054

(73) Assignee: Bob Wood, Cropwell, AZ (US)

( * ) Notice: Subject to any disclaimer, the term of this patent is extended or adjusted under 35 U.S.C. 154(b) by 245 days.

(21) Appl. No.: 11/702,240

(22) Filed: Feb. 5, 2007

(65) Prior Publication Data
US 2007/0193542 A1   Aug. 23, 2007

Related U.S. Application Data

(60) Provisional application No. 60/765,042, filed on Feb. 3, 2006.

(51) Int. Cl.
*F01L 1/02* (2006.01)
(52) U.S. Cl. .............. 123/90.31; 123/90.27; 123/198 P
(58) Field of Classification Search .............. 123/90.27, 123/90.31, 90.16, 90, 39, 90.6, 196 CP, 198 P; 474/182, 900, 903; 74/431, 640
See application file for complete search history.

(56) References Cited

U.S. PATENT DOCUMENTS

| 4,096,836 | A | * | 6/1978 | Kopich | ............... | 123/90.15 |
| 7,007,652 | B2 | * | 3/2006 | Williams | ............... | 123/90.6 |
| 2004/0200315 | A1 | | 10/2004 | Bourne et al. | | |

* cited by examiner

*Primary Examiner*—Ching Chang
(74) *Attorney, Agent, or Firm*—Fay Sharpe LLP

(57) ABSTRACT

A timing belt system for an air cooled Twin Cam V-Twin motorcycle engine is provided. The timing belt system includes a crankshaft pulley assembly including a crankshaft pulley affixed to the crankshaft and a pulley flange affixed to the crankshaft pulley. The timing belt system also includes a camshaft pulley assembly including a spider gear having spindle affixed to the rear cam end of the Twin Cam engine and a hub having slotted apertures fastened to a camshaft pulley fastened. A timing belt having teeth is connects the crankshaft pulley to the camshaft pulley to turn the camshafts in synchronized rotation with the crankshaft. The spider can be rotated relative to the camshaft pulley and fastened thereto using bolts extending through the slotted apertures to Advance or Retard the timing of the camshafts relative to the crankshaft.

14 Claims, 8 Drawing Sheets

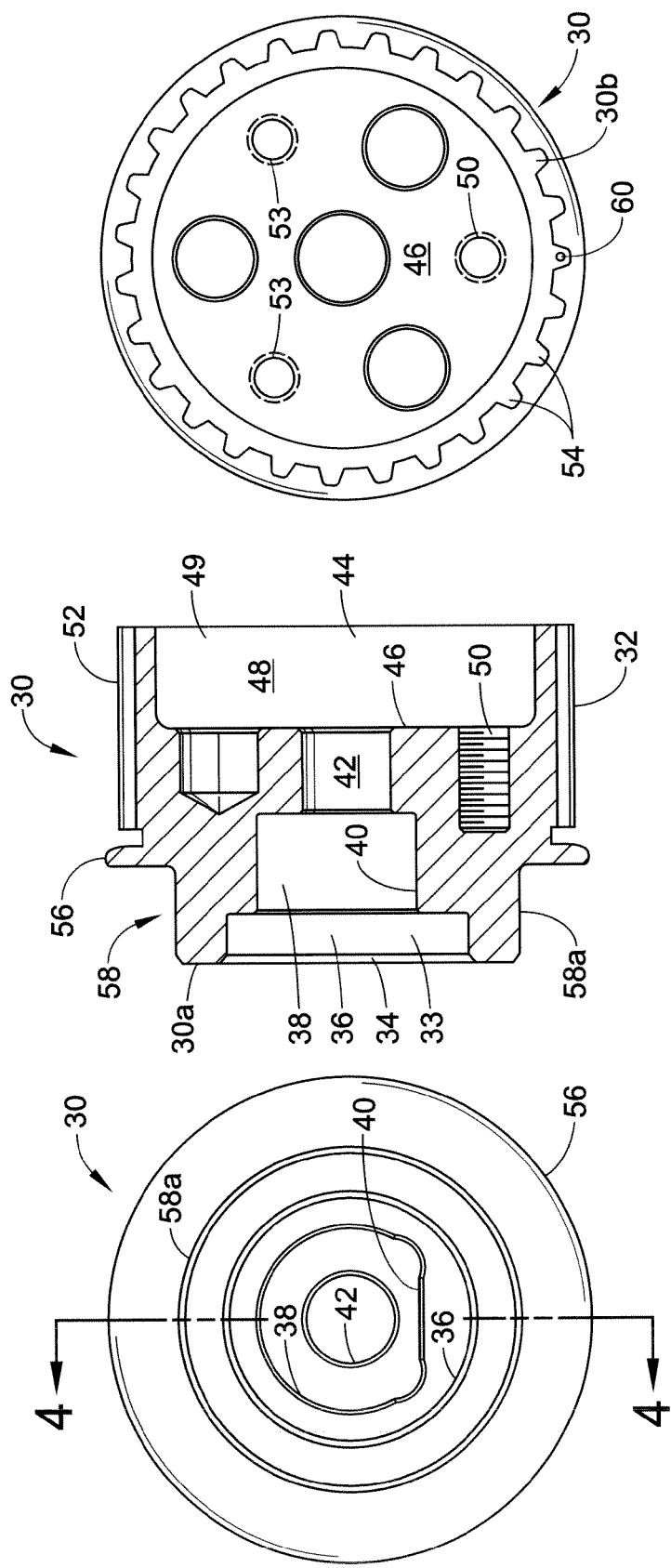

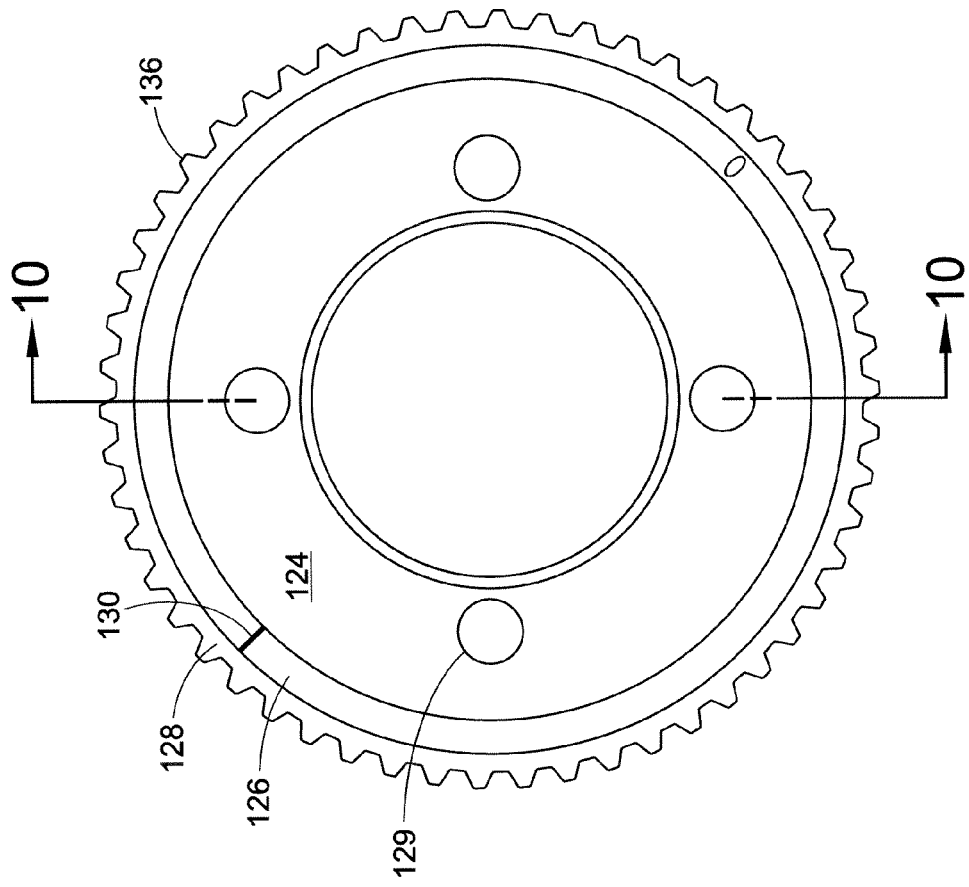
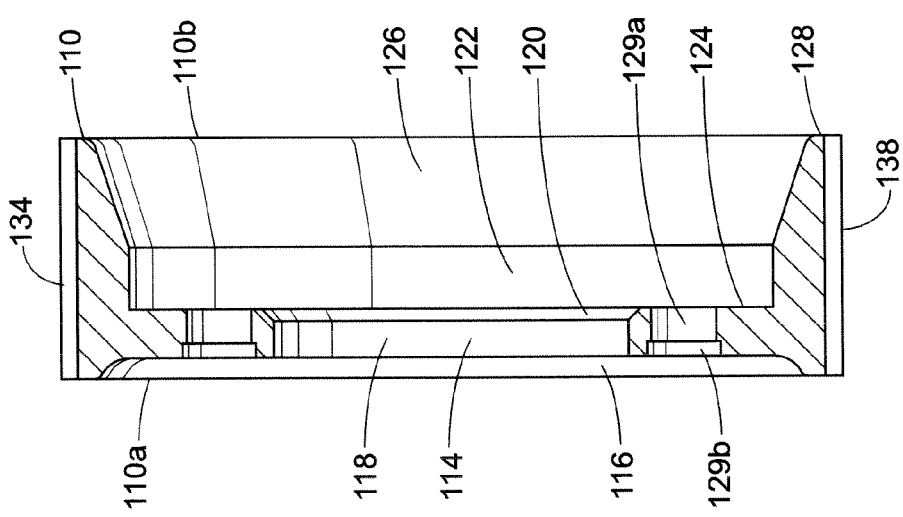

AIR COOLED TWIN CAM V-TWIN MOTORCYCLE ENGINE TIMING BELT SYSTEM

This application claims the benefit of U.S. Provisional Application No. 60/765,042 filed Feb. 3, 2006 which is hereby incorporated herein by reference.

BACKGROUND OF THE INVENTION

Illustrated herein are embodiments of a timing belt drive system for motorcycle engines, and more specifically a camshaft timing belt drive system for air cooled Twin Cam V-Twin motorcycle engines.

Air-cooled V-Twin motorcycle engines, such as the Twin Cam engine used in Harley Davidson® motorcycles have used a chain drive system or gear drive system for driving, or rotating, the camshafts with the engine crankshaft. The chain drive system uses a drive chain connected to the engine crankshaft via a crankshaft sprocket. The drive chain is also connected to a camshaft sprocket which is connected to the camshafts thereby transferring drive forces from the crankshaft to the camshafts for turning the camshafts during engine operation. A chain tensioner having a spring biased pad, or shoe, rides against the chain between the two sprockets to apply tension to the chain. The chain tensioner pad typically wears during use due to this contact with the chain.

Gear drive systems have also been used for driving the camshafts from the crankshaft by using a camshaft sprocket having teeth meshing with the teeth of the crankshaft sprocket. These camshaft gear drive systems can induce gear whine and other undesirable noises during operation.

The present invention contemplates a new and improved camshaft drive system that resolves the above-referenced problems and others.

BRIEF DESCRIPTION OF THE DRAWINGS

The drawings are only for purposes of illustrating preferred embodiments and are not to be construed as limiting the invention. The invention may take form in various components and arrangements of components, and in various steps and arrangements of steps, preferred embodiments of which will be illustrated in the accompanying drawings wherein:

FIG. 3 is a front view of an inner end of a crankshaft pulley for use in a timing belt system for an air cooled Twin Cam V-Twin motorcycle engine in accordance with the present invention;

FIG. 4 is a cross-sectional view along line 4-4 of FIG. 3;

FIG. 5 is an front view of an outer end of a crankshaft pulley for use in a timing belt system for an air cooled Twin Cam V-Twin motorcycle engine in accordance with the present invention;

FIG. 9 is an front view of an outer end of a camshaft pulley for use in a timing belt system for an air cooled Twin Cam V-Twin motorcycle engine in accordance with the present invention;

FIG. 10 is a cross-sectional view along line 10-10 of FIG. 9;

DETAILED DESCRIPTION OF THE PREFERRED EMBODIMENTS

It is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting. For the purpose of clarity and unless stated otherwise or illustrated otherwise in one or more Figures, the term "inner" refers to the direction of, orientation towards, or location closest to the center of the engine crankcase (for parts ultimately mounted thereto/therein), and "outer" refers to the opposite direction, orientation or location, that is, away from the engine crankcase.

Figure 1:
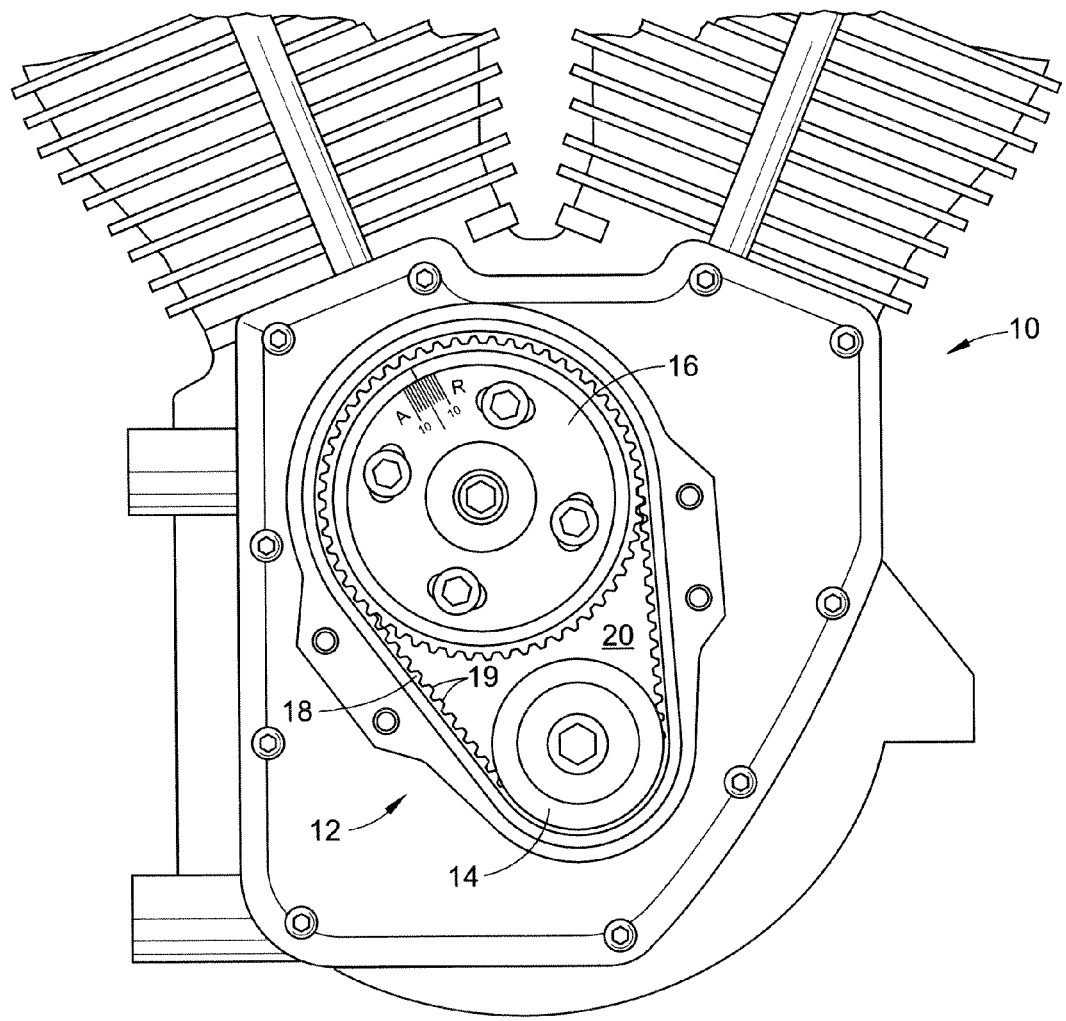
FIG. 1 is a partial side view of an air cooled Twin Cam V-Twin motorcycle engine illustrating a timing belt system in accordance with the present invention.
Figure 2:
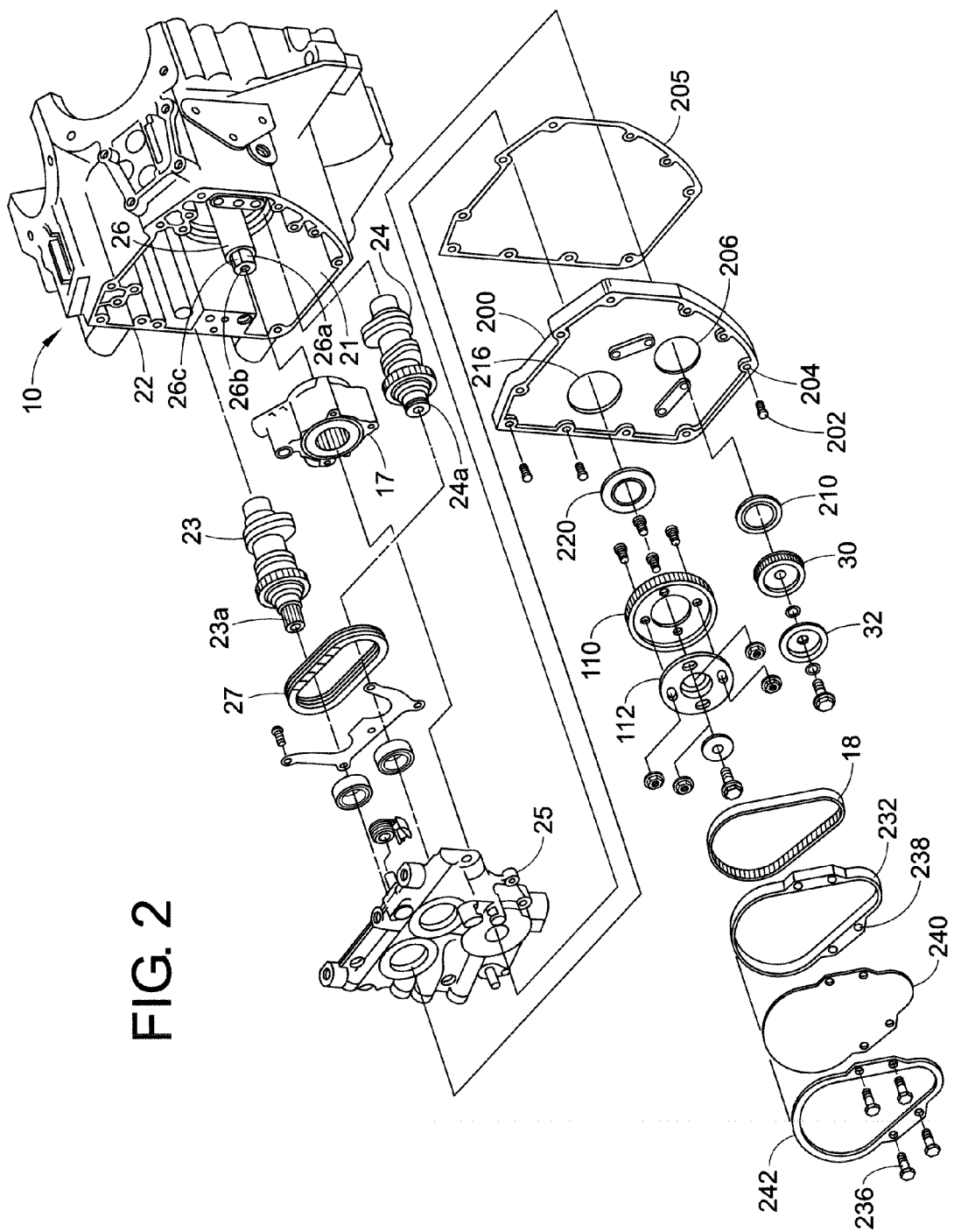
FIG. 2 is an exploded perspective view of a timing belt system in accordance with the present invention.

Referring now to FIGS. 1 and 2, a camshaft timing belt system for an air cooled Twin Cam V-Twin motorcycle engine 10, such as the engines used on Harley Davidson® motorcycles, is shown generally at 12. The camshaft timing belt system 12 is a two pulley system including a Crankshaft pulley assembly 14 and a Camshaft pulley assembly 16 connected together by a timing belt 18 having teeth 19 for mutual synchronized rotation by the engine crankshaft 26 as described in further detail below. The timing belt 18 is preferably a 5 mm belt and is 1 inch wide.

The timing belt 18, Crankshaft pulley assembly 14 and Camshaft pulley assembly 16 are disposed in a dry timing chest 20 located external to the engine's oil-wet (wet) oil pump cavity 21 which includes the oil pump 17, is located within the engine crankcase 22. This region 21 of the engine 10 can also be referred to as the cam chest.

The air cooled Twin Cam V-Twin motorcycle engine 10 includes a pair of camshafts, including a rear cylinder camshaft 23, also known as the rear camshaft, and a front cylinder camshaft 24, also known as the front camshaft. The camshafts 23, 24 include outer ends, 23a and 24a respectively, which are supported by a camshaft support plate 25 disposed within the wet oil pump cavity 21 within the crankcase 22. The engine 10 also includes a crankshaft 26 having an end 26a, extending through the cam support plate 25, with a threaded aperture 26b located thereon and a flat 26c disposed adjacent thereto.

The rear camshaft 23 is coupled to the front camshaft 24 using either a chain 27, also known as the camshaft secondary drive chain or camshaft inner drive chain, or by gears, also known as the camshaft secondary drive gears or camshaft inner drive gears, such that rotation of the rear camshaft also rotates the front camshaft. The inner drive chain 27, or gears, are disposed within the oil pump cavity 21. The inner drive gears can be straight cut gears, though preferably, helical cut gears can be used to reduce gear noise.

In a conventional air cooled Twin Cam V-Twin motorcycle engine, the rear camshaft end 23a is coupled to, and driven for rotation by, the crankshaft 26 using either a chain, known as the camshaft primary drive chain (not shown), or gears, known as camshaft primary drive gears (not shown), as is well known in the art. This conventional chain, or these conventional gears, are also disposed in the wet oil pump cavity 21 within the crankcase 22. The camshaft timing belt system 12, as described herein, replaces these conventional (chain or gear) camshaft driving arrangements, providing several advantages which will be described in further detail below.

Referring now to FIGS. 3-6, the crankshaft pulley assembly 14 includes a crankshaft pulley 30 and crankshaft pulley flange 32 joined together in a coaxial, abutting relationship and affixed to the engine crankshaft 26 in a manner described in further detail below for rotation therewith.

The crankshaft pulley 30 includes an inner end 30a facing towards the engine 10 and an oppositely disposed outer end 30b. An aperture 33 extends through the center of the pulley 30. The aperture 33 includes a bevel 34 extending axially from the inner end 30a to a first portion 36 having a first inner diameter. The first portion 36 extends axially to a second portion 38 having an second inner diameter that is less than the first inner diameter. The second portion 38 includes an alignment flat 40 formed thereon for receiving/abutting the flat 26c formed on the crankshaft 26 as the crank pulley 30 is joined thereto, as described in further detail below. The alignment flat 40, and the close tolerances of the first inner diameter of the first portion 36 and second inner diameter of the second portion 38 of the aperture 33 relative to the outer diameters of the crankshaft 26, taken together prevent the crankshaft pulley 30 from rotating relative to the crankshaft. The alignment flat 40 also aligns the crankshaft pulley 30 angularly for rotation with the crankshaft 26 to provide a known timing reference.

The second portion extends axially to a third portion 42 having an inner diameter that is less than the second inner diameter. The third portion 42 extends axially to a fourth portion 44 which extends through the pulley to the outer end 30b so that the aperture extends through the pulley 30. A recessed outer face 46 is disposed between the third portion 42 and the inner wall 48 of the forth portion 44. The forth portion inner wall 48 and outer face 46 form a cup 49 for receiving the crankshaft pulley flange 32 as described below.

A threaded aperture 50 is disposed in the recessed face 46, such that the center of the aperture 50 is angularly aligned with the center of the alignment flat 40. A screw, such as for example set screw 51 is threaded into the aperture 50 so as to extend above the outer face 46 for angularly aligning the crankshaft pulley 30 and flange 32 and assuring that the flange 32 can only be installed to the crankshaft pulley in one angularly aligned orientation as described in further detail below. Two more threaded apertures 53 are disposed in the recessed face 46, at the same distance from the center of the aperture 33 as the aperture 50, and spaced apart by approximately 120 degrees, as shown in FIG. 5, for providing means for pulling the pulley 30 from the crankshaft 26 using a puller.

The crankshaft pulley 30 includes a toothed portion 52 having teeth 54 for meshing with the timing belt teeth 19. The teeth 54 extend completely around the circumference of the radially outer surface of the pulley 30. The teeth 54 extend axially from the outer end of the pulley 30b to an integral shoulder, or flange 56, extending radially outwardly beyond the teeth and around the circumference of the outer surface to provide an inner shoulder for preventing the belt 18 from moving inwardly off the pulley 30. The crankshaft pulley 30 preferably includes 27 teeth, though other numbers may be used.

The crankshaft pulley 30 includes spindle portion 58 having a radially outer cylindrical surface 58a extending between the inner end 30a and the flange 56. The flange 56 disposed between the spindle portion radially outer surface 58a and the toothed portion 52 as shown in FIG. 4.

A timing mark, such as a recess 60, is disposed on the outer end surface 30b and is angularly aligned with the center of the threaded aperture 50 and the center of the alignment flat 40. The timing mark 60 provides a visual indication of the angular rotational position of engine crankshaft 26 when the crankshaft pulley 30 is mounted thereto.

Figure 6:
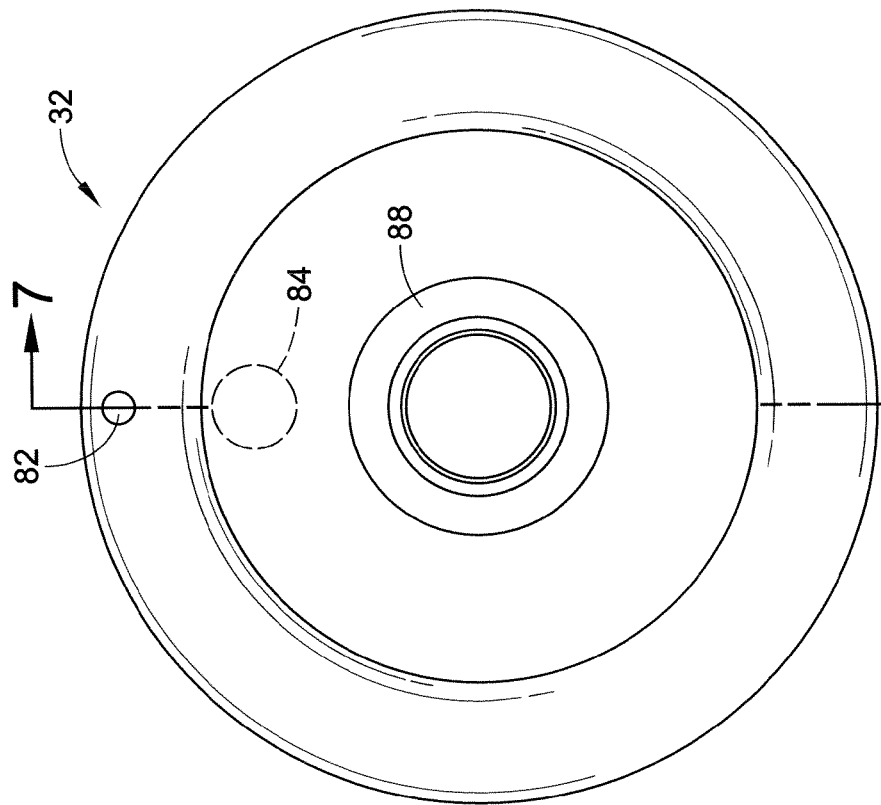
FIG. 6 is an front view of an outer end of a crankshaft pulley flange for use in a timing belt system for an air cooled Twin Cam V-Twin motorcycle engine in accordance with the present invention.
Figure 7:
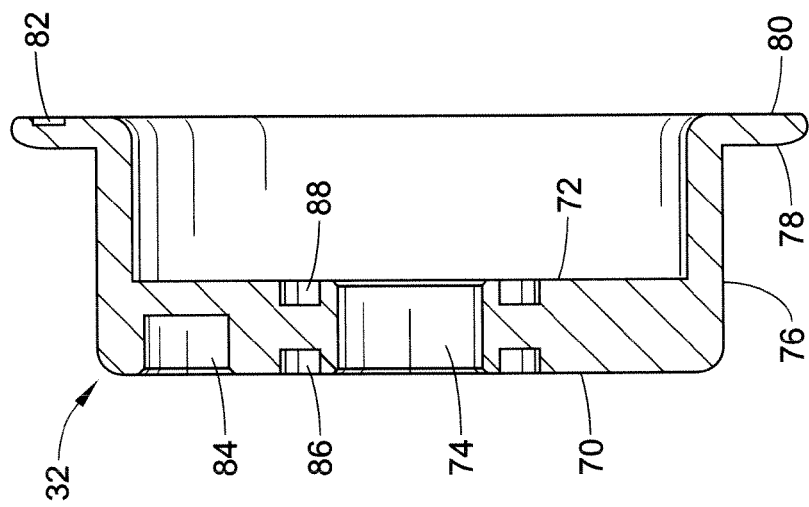
FIG. 7 is a cross-sectional view along line 7-7 of FIG. 6.

The crankshaft pulley flange 32 is cup shaped, having an inner face 70 disposed at an inner end and an oppositely disposed outer face 72 with an aperture 74 extending therebetween and through the pulley flange for receiving a bolt 90 fastening to the crankshaft therethrough. The crankshaft pulley flange 32 further includes a radially outer cylindrical surface 76 extending axially from the inner face 70 to a shoulder 78 disposed at the outer end. An annular outer end surface 80 is disposed opposite the shoulder 78. A timing mark 82, such as for example, a recess, is disposed on the annular outer end surface 80. An aperture 84 having a diameter slightly larger than the diameter of the set screw 51 is disposed in the inner face 70 and does not extend through the flange 32 to the outer face 72 as shown in FIG. 7. The center of the aperture 84 is angularly aligned with the timing mark 82 as shown in FIG. 6.

The flange timing mark 84 is lined up with the crank gear timing mark 60 when the set screw 51 extends into the aperture 84, after the timing belt 18 has been secured over the crankshaft pulley 30 and camshaft pulley 110. This assures the flange can only be installed one way and allows one to visually verify that the cam timing mark is in alignment with the crank gear to make sure the belt has not jumped timing after installation.

An inner annular recess 86 is disposed on the inner face 70 coaxial to the aperture 74, and an outer annular recess 88 is disposed on the outer face 72 coaxial to the aperture 74.

Figure 8:
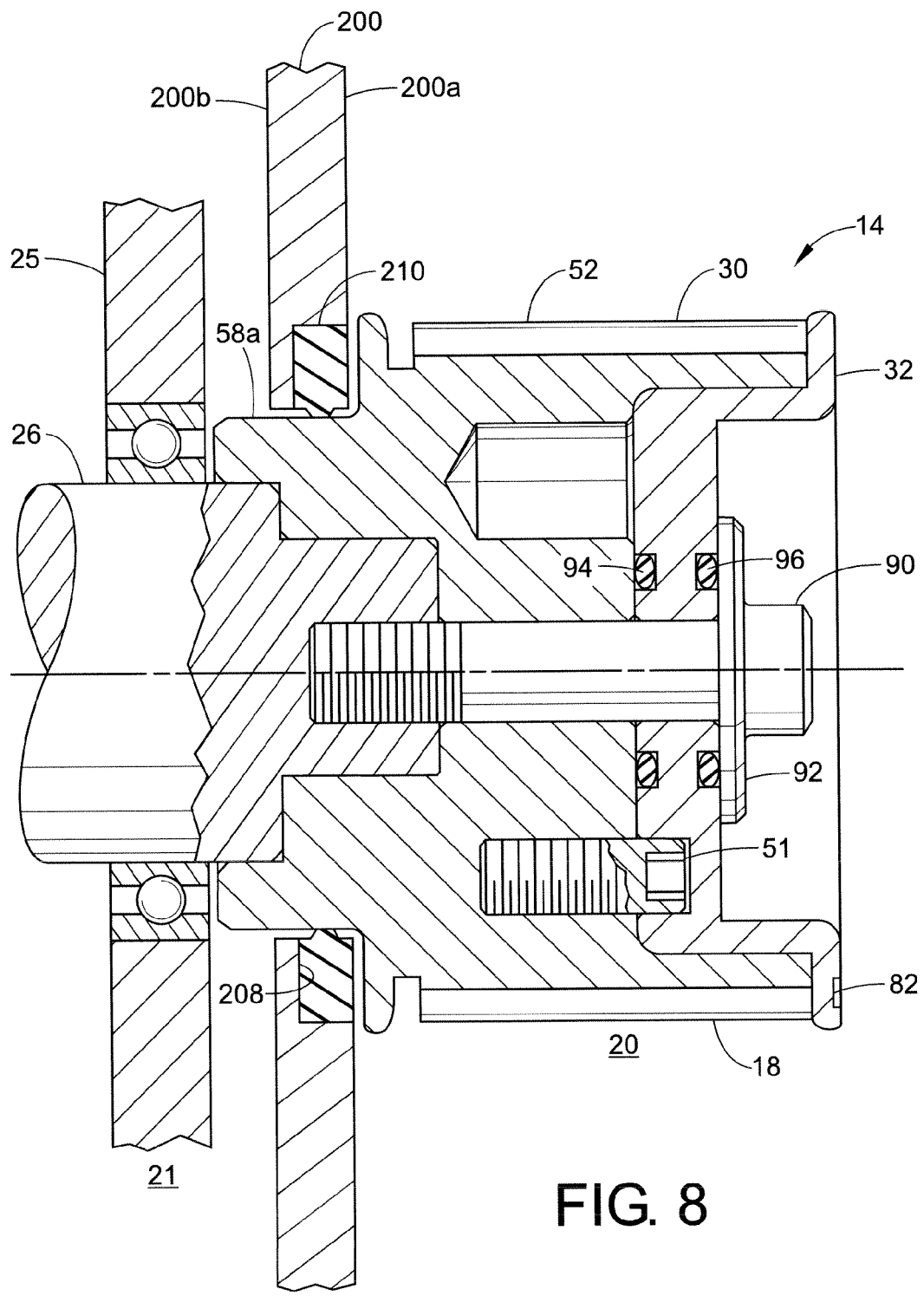
FIG. 8 is a cross-sectional view of a portion of the timing belt system in accordance with invention.

Referring now to FIG. 8, the radially outer cylindrical surface 76 has a diameter less than the diameter of the inner wall 48 of the camshaft pulley enabling the crankshaft pulley flange 32 to be received into the cup shaped forth portion 44 of the crankshaft pulley 30 in a coaxial relationship such that the center of the apertures 33, 74 are axially aligned. The flange shoulder 78 is disposed adjacent to the pulley outer end 30b and extends radially outwardly from the toothed portion 52 to form an outer flange, or shoulder, for preventing the timing belt from moving outwardly, away from the engine, and off the crank pulley 30.

The crankshaft 26 can be inserted into the crankshaft pulley aperture 33 to connect the crankshaft pulley assembly 14 to the crankshaft for rotation therewith. The crankshaft pulley assembly 14 is rotated until the pulley aperture flat 40 coincides with the crankshaft flat 26c to angularly align the crankshaft pulley assembly with the crankshaft. A bolt 90 is inserted through the crankshaft pulley assembly apertures 33, 74 and into the threaded aperture on the end of the crankshaft and tightened to secure the crankshaft pulley assembly to the crankshaft. The bolt 90 can include an integral extended shoulder forming a washer 92, or a separate washer can be used. O-ring 94 is disposed in the crankshaft pulley flange inner recess 86 forming a seal between the crankshaft pulley outer face 46 and the crankshaft pulley flange inner face 70. O-ring 96 is disposed in the crankshaft pulley flange outer recess 88 forming a seal between the crankshaft pulley flange outer face 72 and the bolt/washer 92. The O-ring seal the wet oil pump cavity 21 within the crankcase 22 from the dry timing chest 20 by preventing oil from moving along the engine crankshaft 26 and through the crankshaft pulley assembly apertures 33 and/or 74.

Referring now to FIGS. 9-14, the camshaft pulley assembly 16 includes a camshaft pulley 110 and spider 112 joined together in a coaxial, abutting relationship and affixed to the rear camshaft end 23a in a manner described in further detail below for rotation therewith.

The camshaft pulley 110 shown in FIGS. 9 and 10, includes an inner end 110a facing towards the engine 10 and an oppositely disposed outer end 110b. An aperture 114 extends axially through the center of the pulley 110.

Figure 14:
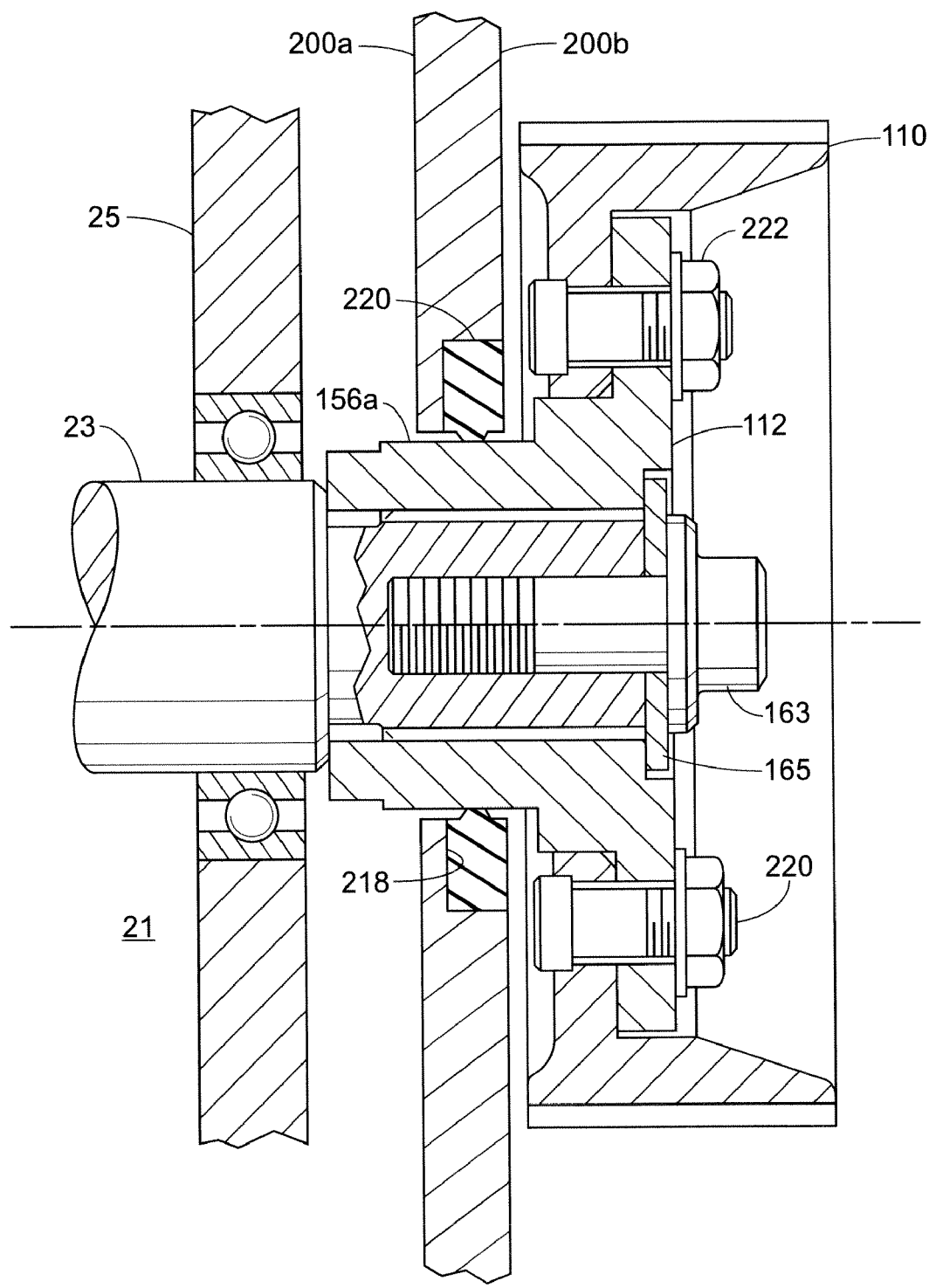
FIG. 14 is a cross-sectional view a portion of the timing belt system in accordance with invention.

The aperture 114 includes a first beveled portion 116 forming a circular recess for providing clearance for bolt heads as shown in FIG. 14. The beveled portion extends axially from the inner end 110a to a first cylindrical portion 118 having an inner diameter sized to receive the spider 112 as described in further detail below. The first cylindrical portion 118 extends axially towards the outer end 110b to a second beveled portion 120 which increases in diameter moving towards the outer end 110b. A second cylindrical portion 122 extends axially from the beveled portion 120 towards the outer end 110b. The second cylindrical portion 122 has an inner diameter, larger than the inner diameter of the first cylindrical portion 118 thereby forming an annular face 124 coaxially disposed about the beveled portion 120 and first cylindrical portion 114. The second cylindrical portion 122 has a diameter sized to receive the spider 112 as described in further detail below. A third beveled portion 126 extends axially from the second cylindrical portion 122 to the outer end 110b. The first beveled portion 116, first cylindrical portion 118, second beveled portion 120, second cylindrical portion 122, annular face 124, and third beveled portion 126 are all coaxially disposed about the central axis of the aperture 114.

Four apertures or bolt holes 129 extend through the camshaft pulley 110 extending through the annular face 124 to the first beveled portion circular recess 116, though other suitable number of bolt holes may be used. The bolt holes 129 are preferably equally spaced apart from each other, for example the four bolt holes are space 90 degrees apart. The bolt holes 129 include a first diameter 129a for receiving a fastener or a bolt and a second larger diameter 129b, disposed at the inner end of the bolt hole for receiving a bolt head.

An outer annular face 128 is disposed at the outer end 110b. A timing mark 130 extends radially along the beveled portion 126. The timing mark 130 can also extend onto the outer annular face 128.

The camshaft pulley 110 includes a toothed portion 134 having teeth 136 for meshing with the timing belt teeth 19. The teeth extend completely around the circumference of the radially outer surface 138 and extend axially from the inner end 110a to the outer end 110b of the pulley. The camshaft pulley 110 preferably includes 54 teeth, twice as many as the number of teeth on the crankshaft pulley 30, though other numbers of teeth may be used keeping the same ratio.

Figures 11, 12:
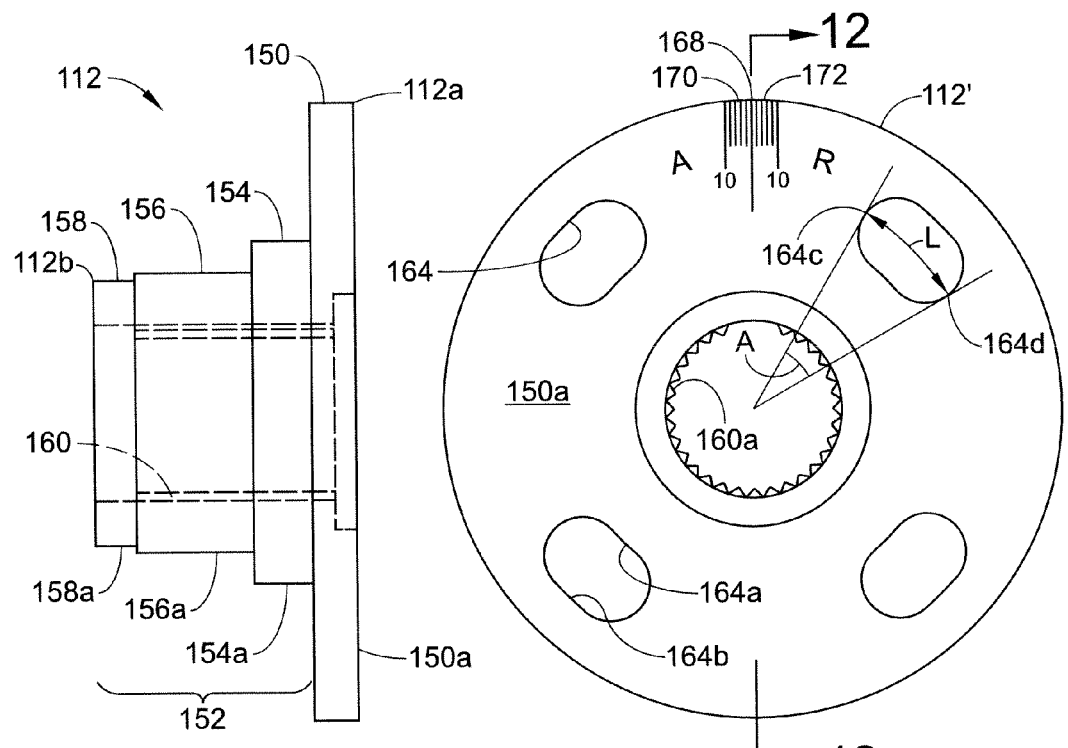
FIG. 11 is an front view of an outer end of a spider gear for use in a timing belt system for an air cooled Twin Cam V-Twin motorcycle engine in accordance with the present invention.
FIG. 12 is a cross-sectional view along line 12-12 of FIG. 11.
Figure 13:
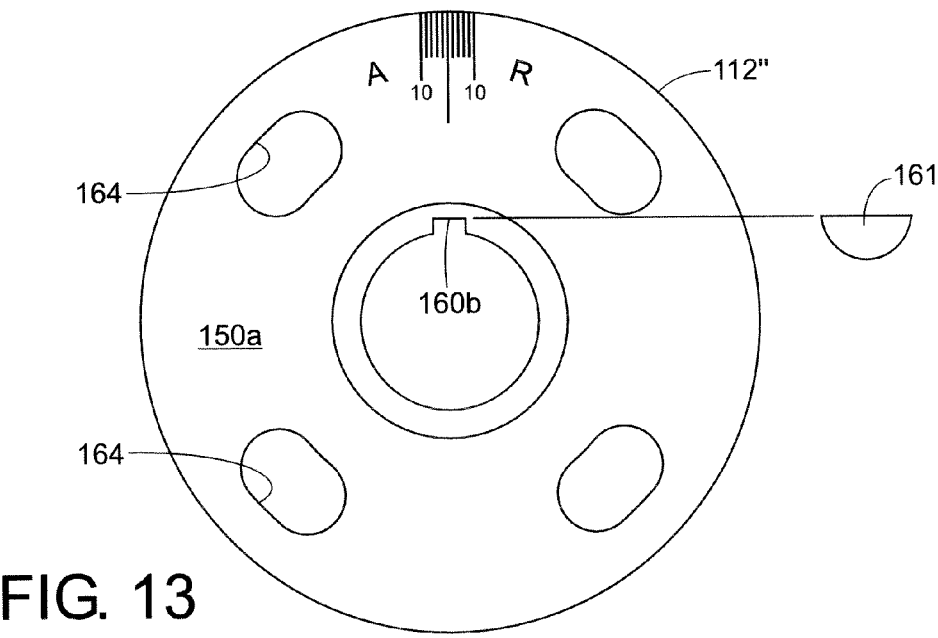
FIG. 13 is an front view of an outer end of a second embodiment of a spider gear for use in a timing belt system for an air cooled Twin Cam V-Twin motorcycle engine in accordance with the present invention.

Referring now to FIGS. 11-13, the spider 112 includes a cylindrical hub 150 having a circular outer face 150a disposed at the outer end 112a of the spider. The cylindrical hub 114 has a diameter sized to be closely received within the second cylindrical portion 122 of the camshaft pulley 110, as shown in FIG. 14 and described in further detail below. The spider gear also includes a spindle 152 formed integrally with and extending from the hub 150 opposite the hub face 150a. The spindle 152 includes a first cylindrical portion 154 extending axially from the hub 150 towards the inner end 112b of the spider 112. The first cylindrical portion 154 has a radially outer surface 154a having a diameter sized to be closely received within the first cylindrical portion 118 of the aperture 114 of the camshaft pulley 110 as shown in FIG. 14. The spindle 152 also includes a second cylindrical portion 156 extending axially from the first cylindrical portion 154 towards the inner end 112b of the spider 112. The second cylindrical portion 156 has a radially outer surface 156a with a diameter less than the diameter of the radially outer surface 154a of the first cylindrical portion 154. The spindle 152 can also include a third cylindrical portion 158 extending axially from the second cylindrical portion 156 having a radially outer surface 158a with a diameter less than the diameter of the radially outer surface 156a of the second cylindrical portion 154.

The spider gear 112 includes an axially extending aperture 160 extending through the hub 150 and spindle 152 for receiving the rear cam end 23a. The aperture 160 can be splined 160a as shown in the first embodiment 112' illustrated in FIG. 11 for coupling with a splined rear cam end, or keyed 160b as shown in the second embodiment 112" illustrated in FIG. 13 for coupling in a pressed relationship with a suitable rear cam end using a woodruff key 161. The spider 112 is, therefore, fixed to the rear cam end 23a, as shown in FIG. 14, so as to rotate the rear cam 26, without creating relative rotation therebetween. A bolt 163, such as a 2 inch-⅜-24 12 point bolt, and washer 165 can be used to fix the splined spider to the cam end as shown in FIG. 14.

Referring to FIGS. 11 and 13, the hub 150 includes four slotted apertures 164 extending therethrough. The apertures 164 are spaced 90 degrees apart on the outer face 150a and coincide with the four bolt holes 129 extending through camshaft pulley 110 to secure the camshaft pulley to the spider as shown in FIG. 14. The slotted apertures 164 are curved, as shown in FIG. 11, having a curved radially inner end 164a and curved radially outer end 164b. The curved slotted apertures 164 extend from a first end 164c along an arcuate length L to a second end 164d subtending an angle A. In the example provided herein, the angle A is 20 degrees, enabling the camshaft pulley to be rotated relative to the spider (and the rear camshaft) 20 crankshaft degrees, 10 crankshaft degrees to the left and 10 crankshaft degrees to the right and fixed thereto with bolts as described below. However, it should be appreciated that other embodiments of the spider gear 112 can have slotted apertures 164 with arcuate lengths L that are longer or shorter, resulting in angle A being increased or decreased respectively from 20 degrees, thereby providing a commensurate amount of timing Advance and/or Retard.

Timing/alignment marks in the form of a timing scale 168 is provided on the outer face 150a of the spider 112. The timing scale 168 has a positive timing adjustment portion in the form of degrees of Advance 170, and a negative timing adjustment portion in the form degrees of Retard 172. In the embodiment described herein, these marks include 10 degrees of advance and 10 degrees of retard, though it should be appreciated that other embodiments can include greater or lesser amounts commensurate with the arcuate length L of the slotted apertures 164 and the angle A subtended thereby.

Referring now to FIGS. 2, 8 and 14, the timing belt system 12 is disposed in the dry timing chest 20 which is separated from the wet crankcase oil pump cavity 21 by a belt drive support plate 200. The belt drive support plate 200 includes an inner side 200a facing the oil pump cavity 21 of the crankcase 22, and an oppositely disposed outer side 200b. The belt drive support plate 200 is shaped to conform to the contours of the existing engine crankcase 22 and fastened thereto using fasteners, such as for example socket head cap screws 202, extending through apertures 204 disposed about the periphery of the support plate. A belt drive support plate gasket 205 is used between an inner surface 200a of the belt drive support plate 200 and the crankcase 22 to prevent oil from escaping from the wet oil pump cavity of the crankcase.

The belt drive support plate 200 includes a first aperture 206 for receiving the crankshaft pulley 30 which extends therethrough. An annular recess 208 is disposed in the outer surface 200b of the support plate 200 encircling the aperture 206 for receiving an annular seal 210. The seal 210 includes at least one sealing surface 210a for sealing against the radially outer cylindrical surface 58a of the spindle portion 58 of the crankshaft pulley 30 as shown in FIG. 8.

The belt drive support plate 200 includes a second aperture 216 for receiving the spider 112 which extends therethrough. An annular recess 218 is disposed in the outer surface 200b of the support plate 200 encircling the second aperture 216 for receiving an annular seal 220. The seal 220 includes at least one sealing surface 220a for sealing against the radially outer cylindrical surface 156a of the second cylindrical portion 156 of the spindle 152 of the spider 112 as shown in FIG. 14.

A timing chest enclosure 230 surrounds the timing belt 18, crankshaft pulley assembly 14 and camshaft pulley assembly 16 to enclose the dry timing chest 20. The timing chest enclosure 230 can include a belt guard 232 fastened to the belt drive support plate 200.

The belt guard 232 includes a wall 234 extending outwardly from the support plate 200 and is fastened to the support plate using bolts 236 extending through apertures 238 formed therein. A belt guard cover 240 and stiffener 242 can be fastened over the belt guard 242 using these same bolts 236. The belt guard cover 240 can be formed of an opaque material such as aluminum or steel or the like, or it can be formed of a clear material such as acrylic to enable a person to view the workings of the timing belt system 10.

The spider 112 is secured to the camshaft pulley 110 using fasteners such as cap screws 220 and nuts 222. The timing can be adjusted by loosening the nuts 222 and rotating the spider 112 relative to the camshaft pulley 110. Rotating the spider 112 will also rotate the rear cam 23, and thus the front cam 24 joined thereto. The spider gear will move 10 crankshaft degrees in the Advance direction and 10 crankshaft degrees in the Retard direction as indicated by movement of the timing mark 130 on the camshaft pulley relative to the timing scale 168 on the outer face 150a of the spider 112.

The timing belt system 10 does not use a tensioner roller, also known as a belt idler, common in timing belt designs.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

The invention has been described with reference to a preferred initial embodiment. Obviously, alterations and modifications will occur to others upon a reading and understanding of this specification. It is intended to include all such modifications and alternations insofar as they come within the scope of the appended claims or the equivalents thereof.

What is claimed is:

1. A camshaft timing belt system for an air cooled Twin Cam V-Twin motorcycle engine with a front cylinder camshaft, a rear cylinder camshaft and a crankshaft having an end with an alignment flat and a threaded aperture, the system comprising:

a spider having a spindle with an aperture adapted to receive the rear cylinder camshaft for affixed rotation therewith and a hub formed integrally with the spindle, the hub having a plurality of slotted apertures and timing marks forming a timing scale;

a camshaft pulley having an aperture receiving the spindle, a face having holes coinciding with the slotted apertures, and a toothed portion;

fasteners extending through the spider hub slotted apertures and the camshaft pulley face holes fixedly securing the camshaft pulley to the spider, wherein the spider can be rotated relative to the camshaft pulley with the fasteners loosened;

a crankshaft pulley having a toothed portion and an aperture adapted to receive the crankshaft for affixed rotation therewith, the aperture having an alignment flat adapted to abut the crankshaft flat for angularly aligning crankshaft pulley with the crankshaft alignment flat;

a timing belt having teeth meshing with the toothed portions of the camshaft pulley and the crankshaft pulley connecting the pulleys together for mutual synchronized rotation; and a support plate adapted to be secured to the motorcycle engine comprising a dry timing chest housing the spider, camshaft pulley, crankshaft pulley and timing belt from an oil wet crankcase cavity of the motorcycle engine.

2. The timing belt system of claim 1 wherein the slotted apertures are curved extending from first ends to second ends along arcuate lengths L each subtending an angle A corresponding to an amount of degrees of timing adjustment the timing belt system can provide to the motorcycle engine.

3. The timing belt system of claim 1 further comprising:
the camshaft pulley toothed portion having twice as many teeth as the crankshaft pulley toothed portion.

4. The timing belt system of claim 1 further comprising:
the crankshaft pulley having a spindle with an outer cylindrical surface;
the spider spindle having an outer cylindrical surface;
the support plate having a first aperture receiving the crankshaft pulley spindle extending therethrough and a second aperture receiving the spider spindle extending therethrough;
a first annular seal having a sealing surface sealing against the outer cylindrical surface of the crankshaft pulley spindle; and
a second annular having a sealing surface sealing against the outer cylindrical surface of the spider spindle.

5. The timing belt system of claim 1 further comprising:
the crankshaft pulley aperture having an alignment flat adapted to abut the crankshaft alignment flat for angularly aligning the crankshaft pulley with the crankshaft;
a crankshaft pulley flange having an aperture aligned with the crankshaft threaded aperture; and
a bolt extending through the crankshaft pulley flange aperture and the crankshaft pulley aperture and into the crankshaft threaded aperture coaxially fixing the crankshaft pulley flange to the crankshaft pulley and the crankshaft pulley to the crankshaft for rotation therewith.

6. The timing belt system of claim 5 further comprising:
the crankshaft pulley toothed portion having teeth extending axially from an outer end, the outer end having an end surface having a timing mark angularly aligned with the center of the crankshaft threaded aperture and the center of the alignment flat providing a visual indication of the angular rotational position of engine crankshaft when the crankshaft pulley is mounted thereto.

7. The timing belt system of claim 5 further comprising:
the crankshaft pulley having an outer face having an aperture, the center of the aperture angularly aligned with a center of the crankshaft pulley alignment flat;
the crankshaft pulley flange having an inner end having an inner face with an aperture and an outer end surface disposed opposite the inner end having a timing mark angularly aligned with the center of the crankshaft pulley flange inner face aperture; and
a screw received in the crankshaft pulley outer face aperture and extending into the crankshaft pulley flange inner face aperture for angularly aligning the timing mark with the crankshaft.

8. The timing belt system of claim 7 further comprising:
the crankshaft pulley having an inner wall and a recessed outer face forming a cup receiving the crankshaft pulley flange in a coaxial abutting relationship; and
crankshaft pulley flange having a radially outer cylindrical surface extending from the inner face to a shoulder disposed adjacent to an outer end of the crankshaft pulley and extending radially outwardly from the crankshaft pulley toothed portion for preventing the timing belt from moving outwardly off the crankshaft pulley.

9. The timing belt system of claim 7 further comprising:
the crankshaft pulley having a flange disposed between the crankshaft pulley spindle outer cylindrical surface and the toothed portion for preventing the timing belt from moving inwardly off the pulley crankshaft pulley.

10. The timing belt system of claim 5 further comprising:
the crankshaft pulley flange having an inner end having an inner face with an inner annular recess disposed coaxially to the crankshaft pulley flange aperture; and
an O-ring disposed in the inner annular recess forming a seal between the crankshaft pulley and the crankshaft pulley flange.

11. The timing belt system of claim 10 further comprising:
the bolt having an integral extended shoulder or including a separate washer;
the crankshaft pulley flange having an outer face disposed opposite the inner face having an outer annular recess disposed coaxially the crankshaft pulley flange aperture; and
an O-ring disposed in the outer annular inner recess forming a seal against the bolt shoulder or the washer.

12. The timing belt system of claim 1 wherein the timing scale has a positive timing adjustment portion in the form of degrees of Advance and a negative timing adjustment portion in the form degrees of Retard.

13. The timing belt system of claim 12 wherein degrees of Advance and the degrees of Retard are commensurate with the angle A subtended by the arcuate length L of the slotted apertures.

14. The timing belt system of claim 13 wherein the marks forming the timing scale include marks indicating 10 degrees of Advance and marks indicating 10 degrees of Retard.

* * * * *